United States Patent
Lachat et al.

(10) Patent No.: US 6,293,580 B1
(45) Date of Patent: Sep. 25, 2001

(54) AIR BAG SYSTEM AND METHOD OF MAKING THE SAME

(75) Inventors: Michael J. Lachat, Shelby Township; Brian K. Genslak, Sterling Heights; Mohammed Boumarafi, Rochester Hills; Jonathon P. Hurford, Lake Orion, all of MI (US)

(73) Assignee: Takata Restraint Systems, Inc., Greensboro, NC (US)

( * ) Notice: Subject to any disclaimer, the term of this patent is extended or adjusted under 35 U.S.C. 154(b) by 0 days.

(21) Appl. No.: 09/541,300

(22) Filed: Apr. 3, 2000

(51) Int. Cl.[7] .................................................. B60R 21/22
(52) U.S. Cl. ................................... 280/728.3; 280/730.2
(58) Field of Search ............................. 280/730.1, 730.2, 280/732, 728.3

(56) References Cited

U.S. PATENT DOCUMENTS

| | | |
|---|---|---|
| 3,630,472 | 12/1971 | Axenborg . |
| 5,498,030 | 3/1996 | Hill et al. . |
| 5,603,523 | 2/1997 | Rhule et al. . |
| 5,651,582 | 7/1997 | Nakano . |
| 5,669,662 | 9/1997 | Maly . |
| 5,678,853 * | 10/1997 | Malyu ................................ 280/730.2 |
| 5,749,597 | 5/1998 | Saderholm . |
| 5,752,714 | 5/1998 | Pripps et al. . |
| 5,845,932 | 12/1998 | Kimura et al. . |
| 5,890,734 | 4/1999 | Saderholm . |
| 5,927,749 * | 7/1999 | Homier et al. ..................... 280/730.2 |
| 5,938,232 * | 8/1999 | Kalandek et al. ................. 280/730.2 |
| 5,988,674 * | 11/1999 | Kimura et al. ..................... 280/730.2 |
| 6,045,151 * | 4/2000 | Wu ..................................... 280/728.3 |

* cited by examiner

*Primary Examiner*—Paul N. Dickson
(74) *Attorney, Agent, or Firm*—Fitch, Even, Tabin & Flannery

(57) ABSTRACT

An air bag system and method of making the same are provided including a reinforced cover for a vehicle seat having an air bag module hidden therein. The reinforced cover includes cover material that is stretchable and a backing reinforcement material that is stiffer than the cover material. The reinforcement material is attached to the cover material to provide a repeatable deployment path for the air bag as it inflates so that the air bag breaks through the seat cover at a preferred location thereon, e.g. bolster seam. The reinforced cover will not expand as the bag inflates as its stiffness or rigidity as provided by the reinforcement material will cause the bag to seek out the area of greater weakness in the cover at the bolster seam which the reinforcement material does not block. As the reinforcement cover provides the repeatable deployment path for the air bag to the bolster seam, there is no need for complicated and expensive modifications to the air bag module for proper and timely deployment thereof simplifying the installation of the present air bag system.

21 Claims, 2 Drawing Sheets

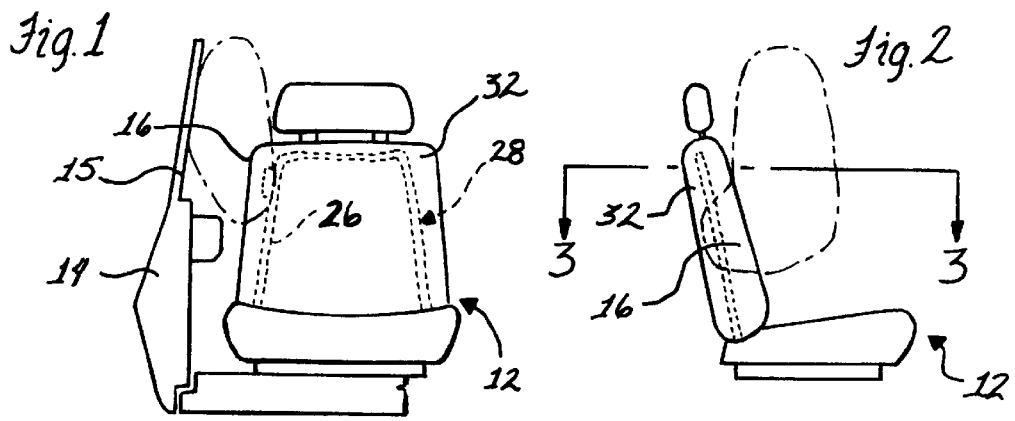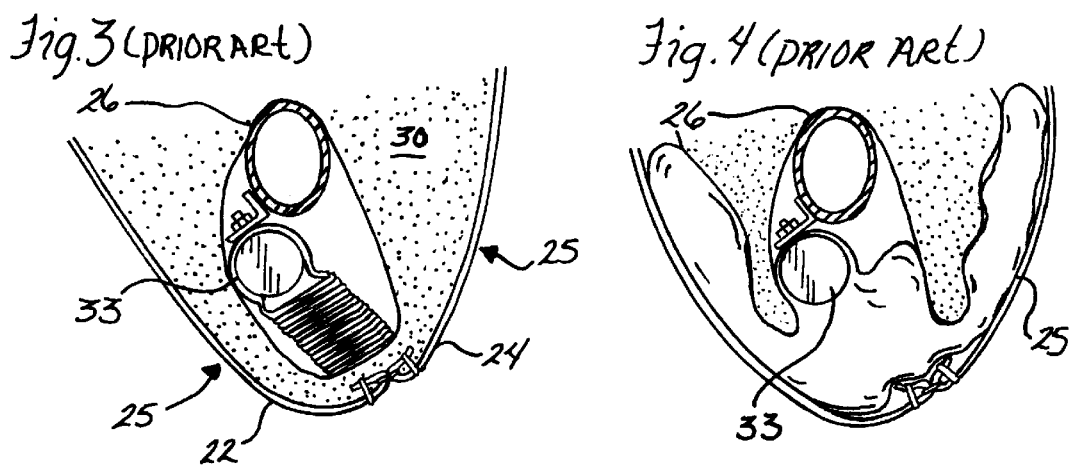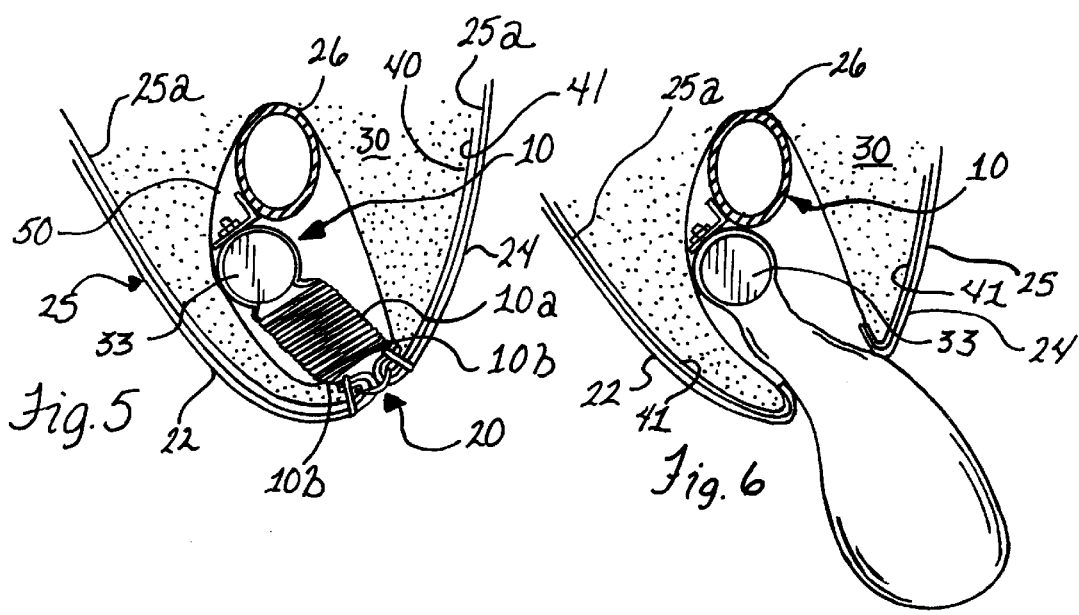

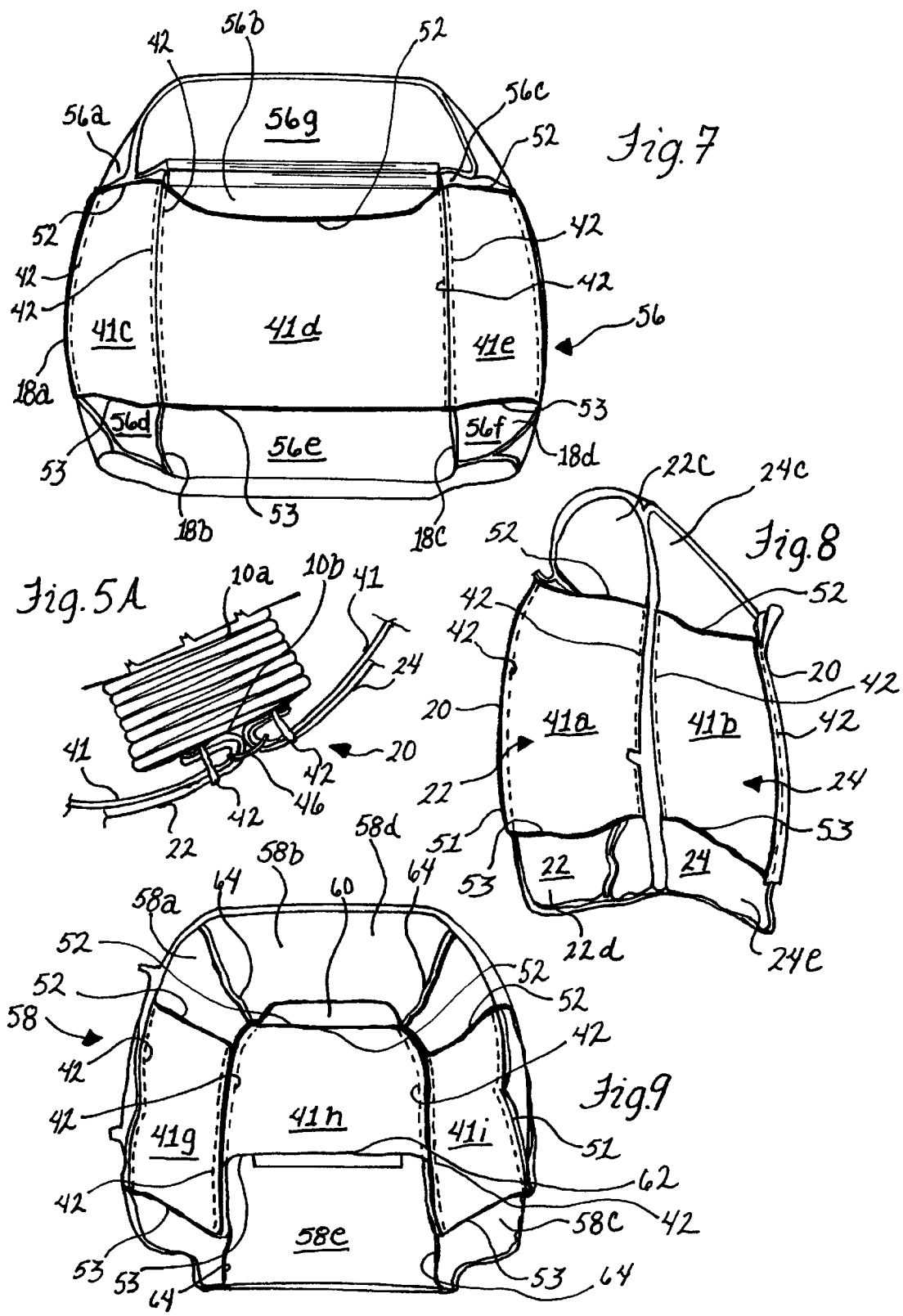

AIR BAG SYSTEM AND METHOD OF MAKING THE SAME

This invention relates to an air bag system having an air bag module mounted within an upholstery material, such as a side-impact air bag mounted within a vehicle seat.

BACKGROUND OF THE INVENTION

Some side-impact air bag modules are currently secured to an internal frame of a vehicle seat and are concealed within the seat by the seat cover. Upon being deployed, the air bag is supposed to expand through a frangible seam in the seat cover at a predetermined location to protect the occupant's head and torso at the event of a side impact sufficient to cause deployment. The timing of air bag deployment in the event of crash conditions is critical in terms of providing the maximum safety benefit thereby, and delays in deployment even on the order of fractions of a second can impair the safety functioning of the air bag. Where the air bag is contained within a seat, it therefore must not experience delays in the time from firing of the air bag to the time the air bag breaks through the intended seam of rupture. However, seat covers are usually of a stretchable material, and in some instances, it has been found that rather than having a proper and timely break through the seam, the air bag will start to inflate the stretchable seat cover prior to emerging from the seam thus delaying the desired time of rupture and bag inflation exterior of the seat. Accordingly, a more predictable path of deployment for an air bag that deploys from within a seat and through an intended seam of rupture is needed to obtain maximum safety benefits with the bag.

Sometimes a new special frangible seam is provided in the seat cover adjacent a bolster seam in the upholstery seat cover material through which the air bag is to be deployed. It is usually preferred that the air bag module be mounted in the seat so that its location is invisible to the seat occupant; and, to this end, the air bag is preferably deployed through a conventional bolster seam joining together adjacent, vertical edges of adjacent panels of the seat cover. If a new deployment seam is used, it is often located near the bolster seam to allow the air bag to deploy at an angle which is not possible with the use of the existing bolster seam. The use of a special seam for air bag deployment detracts from the appearance of the seat and adds additional cost and time to manufacture the seat having an air bag module hidden therein.

To ensure that the air bag properly deploys in a predictable or repeatable path to protect the seat passenger, a chute of fabric material has been wrapped about the air bag module and is fastened to the back of the air bag module by a zipper or threaded fastener. The fastening of the chute behind the air bag is difficult; and, in some instances, so difficult that it has caused the seat manufacturer to use a separate hard plastic panel at the back of the seat rather than the usual upholstery cover fabric at the back of the seat. The hard plastic back panel adds weight and cost to the seat.

Another suggested approach to guide the air bag to deploy through a frangible upholstery seam involves the use of a rigid plastic sheet attached to the foam seat pad and having a slit in the plastic sheet through which the rigid expanding air bag will proceed. The use of the chute or the hard plastic sheet on the foam pad may result in sink marks in the seat deployment seam when the fabric is pulled tight and stitched together. This is especially true where the chute is connected or integral with the seat upholstery material stitched together to form the seam. The appearance of the seam and seat cover are very important and any such air bag sinks or location marks in the fabric are undesirable.

Thus, it will be seen that these chute systems are costly in terms of manufacturing due to the added complexity of the chute and the labor to properly install the chute and air bag module, particularly where the chute fastening is difficult and where it has led to the use of a more costly, hard plastic back seat panel, as above described. Moreover, if a special new seam is required to deploy the air bag at a particular angle, this results in a variety of seat covers each being specific to certain vehicle or vehicle location. Thus, there is a need to eliminate the chute, and/or the special deployment seam in the seat cover, upholstery material.

SUMMARY OF THE INVENTION

In accordance with the present invention, an air bag system and method of making the same are provided including a reinforced cover for a vehicle seat having an air bag module hidden therein. The reinforced cover includes cover material that is stretchable and a backing reinforcement material that is stiffer than the cover material. The reinforcement material is attached to the cover material to provide a repeatable deployment path for the air bag as it inflates so that the air bag breaks through the seat cover at a preferred location thereon, e.g. bolster seam. The reinforced cover will not expand as the bag inflates as its stiffness or rigidity as provided by the reinforcement material will cause the bag to seek out the area of greater weakness in the cover at the bolster seam which the reinforcement material does not block. As the reinforcement cover provides the repeatable deployment path for the air bag to the bolster seam, there is no need for complicated and expensive modifications to the air bag module for proper and timely deployment thereof simplifying the installation of the present air bag system.

Accordingly, a new and improved air bag system is achieved by using a reinforcement, such as a fabric sheet, associated with the upholstery cover material in a manner to direct the expanding air bag to deploy through an adjacent, frangible seam. In the illustrated and preferred embodiment of the invention, an outboard end of the air bag is positioned adjacent a bolster seam in the seat cover and a girdle of reinforcing fabric is attached to seat upholstery material reinforcing the same to reduce or minimize elongation of the seat cover as the air bag expands within the seat. This concentrates the expanding force to break the adjacent bolster seam and to deploy the air bag therethrough. The preferred reinforcing fabric is sewn to the seat cover material and may be a low elongation material such as a fabric sheet of silicone-coated nylon fabric.

In the preferred embodiment of the invention, an opening or cavity is formed in the seat foam pad to receive the air bag module with the outboard end of the folded, air bag essentially flush with the seat foam pad about the air bag module. The outboard end of the folded air bag may be positioned against a portion of bolster seam through which it is to deploy without the use of a chute or use of a hard plastic piece. Thus, the labor and cost of the chute system is eliminated with the present invention.

In another aspect of the invention, a method of making a side-impact air bag installation is provided including providing a seat frame, providing a seat pad material on the seat frame, positioning an air bag module in the seat pad material adjacent the seat upholstery, providing a seat cover upholstery material with a reinforcing fabric thereon at selected portions to cause the inflating air bag to be directed to expand at a predetermined location for air bag deployment, and stitching together adjacent panels of the reinforced upholstery material to form a bolster seam at the predetermined location and through which bolster seam. the air bag deploys. In the preferred method, there is an encircling of the air bag module by the reinforcing fabric.

BRIEF DESCRIPTION OF THE DRAWINGS

FIG. 1 is a front elevational view of a vehicle passenger seat with a deployed side-impact air bag;

FIG. 2 is a side elevational view of the deployed side-impact air bag of FIG. 1;

FIG. 3 is an enlarged fragmentary sectional view of a conventional passenger seat having a air bag therein for being deployed through a bolster seam thereof;

FIG. 4 is a view similar to FIG. 3 showing deployment of the air bag expanding the seat cover prior to breaking through the bolster seam;

FIG. 5 is a fragmentary sectional view of an air bag system constructed in accordance with the invention showing an air bag module and reinforced upholstery material;

FIG. 5A is an enlarged, fragmentary view of the bolster seam showing the reinforcement fabric ply behind the seat cover;

FIG. 6 is a fragmentary view of the air bag of FIG. 5 deployed through the frangible bolster seam;

FIG. 7 is an interior view of the back panels of a reinforced upholstery seat cover used in accordance with the invention;

FIG. 8 is an interior view of the side panels of a reinforced upholstery seat cover used with the panels shown in FIGS. 7 and 9 to cover a seat; and FIG. 9 is an interior view of the reinforced panels of the front portion of the seat cover.

DETAILED DESCRIPTION OF THE PREFERRED EMBODIMENTS

As shown in the drawings for purposes of illustration, the invention is embodied in a side-impact air bag module or assembly 10 mounted within a vehicle seat 12 for expansion into an expanded state, as shown in FIGS. 1 and 2 to protect the head and torso of a seated passenger from side impacts. The distance or space between an adjacent vehicle side 14 and trim 15 and a facing vehicle side 16 of the seat, door and window is quite short. Also, the packaging constraints are tight within the seat itself for the air bag module alone, without the addition of a chute within the seat to direct the air bag.

In some prior art installations and as previously described, a fabric chute pouch surrounds the air bag module 10 and the pouch has a deployment chute end located adjacent a seam 20 which can be either a new special seam for some vehicles or a bolster seam joining together adjacent panels 22 and 24 of a seat cover upholstery material 25. The air bag module and chute pouch are attached to a rigid vehicle structure such as a rigid rail 26 of a seat frame 28. The module and pouch are surrounded by foam material 30 of a cushion portion of a seat back 32 of the seat. The pouch has its chute opening aligned with the frangible seat cover seam 20. As explained hereinbefore, the chute is fastened to the back of the air bag module by means of a zipper or threaded fasteners. At the time of a suitable impact, gas generator 33 is actuated to generate gas, which is discharged into the air bag in a forwardly direction towards folds 10a in the folded deployment portion of the air bag which expands to move through the now-open end of the pouch and to the upholstery seam and to break open the upholstery seam.

Chutes are undesirable as they increase the complexity of the air bag module driving up costs therefor. Other systems use plastic doors or panels which similarly raise costs for the system. Further, hard portions of the module adjacent the outer cover or skin of the seat are not desirable such as plastic doors as they can produce discomfort and create sink marks, as previously discussed.

A further problem which can even occur where chutes are used are inherent to the use of seat cover upholstery material that is stretchable and gives to allow for different sizes of passengers to seat comfortably thereon. Referring to FIGS. 3 and 4, the stretchable seat cover can delay the time at which the deployed air bag breaks therethrough, as instead of rupturing the seam 20, the expanding bag pushes the cover 25 outward so that, as illustrated, it separates from the foam 30 and as the bag continues to inflate it spreads in directions away from the seam 20 as opposed to causing its rupture at the desired time. Manifestly, this delay in proper operation of the bag is to be avoided as the timing of air bag deployment from the time the generator 33 fires to the time the bag is inflated between the vehicle side 14 and trim 15 and seat side 16 is critical to its effectiveness.

In accordance with the present invention, the expandable upholstery cover material 25 is reinforced to direct the expansion of the folded air bag to break the frangible bolster seam 20 in the reinforced upholstery material to deploy through this seam as the folded air bag portion moves from the undeployed position of FIG. 5 to the deployed position of FIGS. 1, 2 and 6. In this regard, the inflation of bag folds 10a causes the bag to rupture the seam 20 at the appropriate time after air bag firing without undue delays caused by stretching of the seat cover material 25 prior to seam rupture due to its reinforcement with a low elongation fabric material. Herein, this reinforcement of the upholstery cover material is achieved by a reinforcing material 40 in the form of a fabric ply 41 which is secured to an inner side or face 25a of the upholstery cover material, as discussed. Preferably, the reinforcing material 40 is a material having a significantly lower elongation than the upholstery fabric material that is often a readily elongated material. As will be explained in conjunction with FIGS. 7 and 8, the preferred reinforcement comprises an encircling girdle of fabric surrounding the air bag module on the left and right sides of the seat as well as the front and back sides of the seat Preferably, the outboard end 10b of the folds 10a in the air bag is located essentially flush with the bolster seam 20 allowing the entire module 10 to be placed closer to the seat external cover 25 thus providing space savings in the seat 12, as best seen in FIG. 5A.

Continuing with reference to FIG. 5A, the reinforcing ply 41 is secured by stitches 42 to join its panels 41a and 41b (FIGS. 5 and 8) to the respective seat cover panels 22 and 24 on opposite sides of the bolster seam 20. The bolster seam 20 joins together the adjacent edges of the reinforced seat cover panels with the outboard end 10b of the folded air bag essentially flush with the foam 30 adjacent the bolster seam 20, as depicted in FIG. 5. Herein an opening or pocket 50 is formed in the foam material to receive the air bag module 10 and to mount the outboard end 10b of the folded, air bag adjacent to the frangible bolster seam 20. Because there is no chute or hard plastic doors necessary with the present system, the foam can keep areas around the seam 20 free from sink marks and make the location of the air bag module deployment end invisible to the seat passenger. As will be explained hereinafter, the present invention provides easier assembly than the prior art chute systems. Also, compared to prior art chute systems, particularly those using a hard plastic back seat cover panel, the present invention is lighter in weight and lower in overall cost. The present invention provides flexibility in that the same reinforced seat material may be used in non-air bag applications as well as air bag applications.

Turning now in greater detail to the reinforcing material 40, it is preferably a fabric sheet material that does not interfere with the use or the appearance of the seat cover, yet is strong enough to add resistant to elongation of the seat cover, which is usually a readily stretchable and elongatable material. A preferred reinforcing material 40 is a ply 41 of silicone-coated nylon fabric, e.g. 420 denure. Herein, the fabric ply 41 is in the form of a girdle comprised of ply portions 41a–41i attached to respectively associated seat cover panel portions, as best seen in FIGS. 7–9. FIGS. 7–9 illustrate the interior sides or surfaces of the seat panels 22 and 24 as well as the interior surfaces of the remaining front and seat back panels shown in FIGS. 7 and 9. The reinforcement side panels 41a and 41b have, as shown in FIG. 8, vertical side edges or ends 51 attached by stitches 42 to vertical ends of the cover panels 22 and 24, respectively. The reinforcing plies 41a and 41b have upper ends 52, which are not stitched horizontally to the seat cover panels 22 and 24, which are located substantially below uncovered upper seat panel portions 22c and 24c. Lower ends 53 of the respective reinforcing plies 41a, 41b are located above lower panel portions 24d and 24e, respectfully, on the seat cover panels 22, 24. Thus, the reinforcing plies 41a and 41b are coextensive in width between vertical sides of the seat, side panels 22, 24, but are much shorter in height leaving the upper and lower portions 22c, 24c and 22d, 24d, respectively, uncovered and exposed.

The reinforcing plies 41a and 41b are thus attached to the side panels 22 and 24 of the seat cover along vertical lines of stitches 42 adjacent bolster seam 20 between the cover panels 22 and 24. As described above, the reinforcing plies are preferably not stitched along their upper and lower horizontal ends to the associated seat cover panels. This assists in allowing the seat panels 22 and 24 to perform from a passenger seating and comfort standpoint substantially as though the reinforcing panels are not present. When the air bag is expanding, the reinforcing plies 41a and 41b, along with the other reinforcing plies of the girdle, resist elongation or stretching of the seat cover panels to assure proper deployment of the outboard end 10a through the closely adjacent bolster seam 20. The seat will have left and right side cover portions, as shown in FIG. 8, with one being for the inboard side of the seat and the other being for the outboard side of the seat. Only the outboard one of the side seat cover portions of FIG. 8 will have the air bag module located adjacent its bolster seam 20.

Preferably, the back portion 56 of the seat cover has reinforcing ply portions 41c, 41d, and 41e that are substantially coextensive in width to their respectively attached, back panels 56a, 56b and 56c. Herein, the vertical, inner stitches 42 (FIG. 7) attach the respective inner vertical edges of the respective ply portions along bolster seams 18a, 18b, 18c and 18d at the vertical inner edges of the respective seat back panels 41c, 41d and 41e. The bolster seams have stitches 46 (FIG. 5A) joining together the respective back panels 56a, 56b and 56c. Upper edges 52 of these respective reinforcing plies are not stitched to their associated seat cover panels; and likewise, lower edges 53 of the respective reinforcing plies are not stitched to their associated seat cover panels. This leaves lower portions 56d, 56e and 56f of the respective back panels 56c, 56d, and 56e without being reinforced by a reinforcing ply thereon. Thus, the girdle portion of the reinforcing material 40 covers only a central, selected portion of the back of the seat cover and this is where the expansion forces of the expanding gas will be trying to elongate the wide expanse of seat cover. Because the upper and lower edges 52, 53 of the reinforcing material sheets on the back panel are not stitched to seat cover material, the back panel 56 should be able to stretch and perform much in the same manner that it would if the reinforcing plies were not attached thereto. The back seat cover also has an upper panel 56g that is secured along its lower edge by stitches to a bolster seam and thereby to the tops of the respective back seat panels 56a, 56b and 56c. The upper panel 56g is not reinforced with a reinforcing backing ply and is free to elongate and stretch as the air bag is deployed. The back cover is joined by stitches to opposite side covers, such as shown in FIG. 8, and to the front cover, as shown in FIG. 9, to enclose the seat pad, air bag module, and seat frame therein.

The girdle of reinforcing material 40 is also, preferably, applied to the front portion 58 of the seat cover, which is shown in FIG. 9, as having three reinforcing ply portions 41g, 41h and 41i secured to the front seat cover. The interior side of front seat cover which is shown in FIG. 9 has the girdle attached to three seat cover panels 58a, 58b and 58c. The right hand panel 58c will be on the left and joined to the side panel 22, which is shown in FIG. 8. The reinforcing plies 41g, 41h and 41i each have their respective edges stitched by stitches 42 to a corresponding vertical edge on the underlying front cover panel 58a, 58b and 58c. The illustrated front seat cover also has upper and lower central panel portions 58d and 58e which are not covered by a reinforcing ply, in this instance. The central front cover panel portion 58b has its upper edge stitches at area 60 to the lower edge of the upper cover panel portion 58d and its lower edge stitched to the upper edge of the lower cover panel portion 58e at area 62. Bolster seams 64 are shown in FIG. 8 joining the respective back panels together.

As with the back cover described in connection with FIG. 7, the upper and lower, horizontal edges of the reinforcing plies are not stitched to the associated panel of the front seat cover. The reinforcing cover material covers only a central portion of the front seat cover leaving the seat cover without reinforcement plies above the ply upper edges 52 and below the ply lower edges 53.

Thus, the front, back and two side seat cover portions all have a central band of reinforcing plies 41a–41h that cumulatively comprise an encircling band or girdle about the gas generator module 10 and the folded air bag 10a. Manifestly, the reinforcing plies need not totally surround or encircle the air bag module as described herein for this illustrated embodiment of the invention. Different seats and different seat covers from that illustrated herein may allow the elimination of or the addition of additional reinforcing material. Seat covers are made of various woven fabrics and often are made of leather with each seat cover material having different elongation characteristics. Also, various seats have different pad, frame constructions, and various shapes and numbers of cover panels sewn at different locations. Thus, the present invention is not limited to any particular seat or seat cover construction, such as that illustrated and described herein, but is adapted to be used with various seats and seat covers. While the reinforcing material is shown as being sewn by stitches to the superimposed seat cover panel, the reinforcing material can be positioned in the seat in various other manners and fall within the purview of the invention as defined by the claims, as set forth hereinafter.

The reinforcing material 40 is a significant advantage as rather than expanding the stretchable seat cover material 25, the low stretch nature of the material 40 causes the inflating, unfolding air bag to seek out the path of least resistence which, in this instance, is to and through the adjacent bolster seam 20. This is because the reinforced seat cover 25 of the present invention provides greater resistance to bag travel and expansion such as between it and the padding material 30 therein than does the stitched seam 20. In this manner, the present invention provides a repeatable deployment path for the air bag without requiring expensive modifications via chutes and the like to the module 10 herein. Further, the invention herein provides advantages in assembly of the seat having the air bag module hidden therein and no longer do accommodations need to be made for accessing the rear of the module for attaching a chute thereto such as by providing a plastic panel on the seat, as discussed earlier.

The present invention eliminates some problems with current manufacturing processes involving the packaging of the air bag module in a seat by reducing labor and/or complexity of installation associated with the use of a chute. Also, the method of the present invention eliminates problems with appearance when using a chute and pulling the fabric taut around the module leaving sink marks in the seat cover seam. Moreover, the present invention eliminates the sometimes difficult labor problem encountered with fastening the chute behind the air bag module; and eliminates the need, in some instances, for a hard plastic back panel to close out the seat.

From the foregoing, there is described the method of the invention which comprises providing a seat pad 30 on a seat frame 28, positioning an air bag module 10 in the seat pad adjacent a cover portion of the seat cover material 25, providing reinforcing material 40 on the seat cover material at selected portions of the seat cover material to reinforce the seat cover to reduce elongation caused by the inflating air bag 10*a* and to direct the air bag to expand through a frangible seam, and stitching together adjacent panels 22 and 24 of the reinforced, upholstery material to form a bolster seam 20 at a predetermined location adjacent to and through which the expanding air bag deploys. In the preferred method, the foam pad has an opening or cavity 50 therein and the air bag module is positioned in the cavity 50 with an outboard end of the air bag 10*a* adjacent the bolster seam 20 and, preferably, substantially flush with the outboard side of the foam pad 30 around module 10. Herein, the reinforcing panels are stitched to the seat cover panels and the same seat cover panels may be used whether or not an air bag module is used with the seat. As compared to use of a hard plastic back panel for the seat, the method of the invention provides reduced weight and lower cost. No special new deployment seam is used or needed as with some prior art chute systems.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed:

1. In a motor vehicle having a deployable air bag in a seat thereof, the combination comprising:

a gas generator;

an inflatable air bag having one end connected to the gas generator to receive gas therefrom to inflate the air bag, and an outboard end generally opposite the one end;

a cover sheet on the vehicle seat of a first material with a predetermined rigidity thereof, and having first and second panels each of a predetermined size including a predetermined width and height;

a frangible seam joining the first and second panels and located at a preferred air bag deployment location with the outboard end of the bag adjacent the seam so that upon deployment thereof the outboard end directly engages the seam; and a fabric reinforcement material of a predetermined rigidity greater than that of the cover sheet material, and attached at predetermined locations on the first and second panels coordinated with the position of the air bag so that the expansion forces of the air bag are taken thereby, and adjacent the frangible seam to cause the inflating air bag to seek the frangible seam and to deploy through the preferred deployment location, the fabric reinforcement material sized to extend for substantially the full width of each of the panels and less than the full height to minimize elongation of the full widthwise expanse of the seat cover sheet panels and keeping the amount of material used for the reinforcement material to a minimum.

2. A combination in accordance with claim 1 wherein the fabric reinforcement material is secured to the first and second panels on opposite sides of the frangible seam to resist elongation of the first and second panels and to cause breaking of the frangible seam.

3. A combination in accordance with claim 2 wherein the fabric reinforcement material comprises:

a fabric girdle stitched to the first and second panels.

4. A combination in accordance with claim 1 wherein the cover sheet comprises:

an external upholstery material of a vehicle seat.

5. A combination in accordance with claim 4 comprising:

a seat foam pad in the seat disposed substantially about the air bag module.

6. A combination in accordance with claim 5 wherein the fabric reinforcement material comprises:

plies of fabric material stitched to the cover sheet adjacent the frangible seam; and the frangible seam comprises a bolster seam joining together first and second panels of seat upholstery.

7. A combination in accordance with claim 6 including the vehicle seat with the gas generator and air bag deploying the air bag to serve as a side-impact bag for a passenger on the vehicle seat.

8. A combination in accordance with claim 6 wherein the fabric material comprises:

a girdle secured to the seat upholstery along portions of the seat front, seat back, and at least one side of the seat having the frangible seam therein.

9. A combination in accordance with claim 8 wherein the girdle comprises a fabric of silicone-coated nylon having an elongation less than that of the upholstery material.

10. A combination in accordance with claim 6 wherein:

vertically disposed stitches join vertical edges of the reinforcement plies to vertical edges of the seat cover panels adjacent an associated bolster seam;

horizontally disposed edges of the reinforcement plies being substantially unattached to their associated seat cover panels.

11. A method of making a side-impact air bag installation comprising:

providing a seat frame;

providing a seat pad material on the seat frame;

providing a seat upholstery material including a plurality of panels each of a predetermined size having a predetermined width and height attached over the seat pad material and about the frame;

positioning an air bag module in the seat pad material so that an outer end of the air bag is adjacent the seat upholstery material;

attaching a reinforcing fabric material to the upholstery panels at selected central portions thereof to extend for substantially the full width of each of the panels and less than the full height leaving upper and lower portions of the seat upholstery material panels exposed;

coordinating the position of the air bag module with that of the reinforcing fabric so that expansion forces of the air bag created by gas from a generator are directed at the central portions of the upholstery material with the reinforcing fabric thereat minimizing elongation of the upholstery material in the central portion thereof to cause the inflating air bag to expand in a predetermined deployment path for emerging at a predetermined location on the seat upholstery material; and stitching together adjacent panels of the reinforcing fabric material at a frangible seam between the upholstery panels located at the predetermined location for air bag deployment.

12. A method of making a side-impact air bag installation in accordance with claim 11 comprising:

encircling the air bag module with a girdle of the reinforcing fabric.

13. A method of making a side-impact air bag installation in accordance with claim 11 comprising:

positioning the air bag module in the seat pad with the outboard end of the air bag substantially flush with an outboard edge of the pad adjacent the frangible seam.

14. A method of making a side-impact air bag installation in accordance with claim 11 comprising:

forming the frangible seam by abutting panel edges of previously stitched together upholstery material and reinforcing fabric; and stitching across the previously abutted and stitched edges to form the seam.

15. A method in accordance with claim 14 comprising:

providing the reinforcing material in plies stitched along vertical edges to an associated seat cover panel with horizontal edges of the plies being substantially unattached to the seat cover panels.

16. A motor vehicle seat having a side-impact air bag comprising:

an internal seat frame;

padding on the seat frame;

a plurality of interconnected panels of upholstery cover material covering the pad material, the panels each having upper and lower portions with a central portion therebetween;

a plurality of bolster seams stitching together the interconnected panels of upholstery cover material;

an air bag module having an outboard end mounted adjacent a vertical one of the bolster seams which is to serve as a deployment seam; and a reinforcement material selectively positioned on the upholstery cover material to prevent the air bag from deploying through the other bolster seams and to deploy through the deployment seam adjacent the outboard end of the air bag module, the reinforcement material including a plurality of ply portions each associated with one of the upholstery panels with the ply portions sized and attached to cover the upholstery panel central portions leaving the upholstery panel upper and lower portions exposed to minimize the reinforcement material that is used relative to the upholstery material.

17. A motor vehicle seat in accordance with claim 16 wherein:

the reinforcement material comprises a fabric having a predetermined elongation to resist expansion under pressure from the inflating air bag of the air bag module.

18. A motor vehicle seat in accordance with claim 17 wherein:

stitches join the fabric reinforcing material to the upholstery cover material to form the multiple-ply seat upholstery cover material for being stitched at the bolster seams.

19. A motor vehicle seat in accordance with claim 18 wherein:

the reinforcing material plies are stitched along vertical edges to the panels of the upholstery material with the horizontal edges of the plies being substantially free of stitches and connection to the associated seat cover panel.

20. A motor vehicle seat in accordance with claim 16 wherein:

an encircling girdle of the reinforcement material substantially encircles the air bag module.

21. A motor vehicle seat in accordance with claim 18 wherein the reinforcing fabric comprise a silicone-coated nylon material.

* * * * *